United States Patent
Nadeau (10) Patent No.: US 12,498,969 B2
(45) Date of Patent: Dec. 16, 2025

(54) DISTRIBUTED, DECENTRALIZED TRAFFIC CONTROL FOR WORKER PROCESSES IN LIMITED-COORDINATION ENVIRONMENTS

(71) Applicant: Microsoft Technology Licensing, LLC, Redmond, WA (US)

(72) Inventor: Philip Raymond Nadeau, Bothell, WA (US)

(73) Assignee: Microsoft Technology Licensing, LLC., Redmond, WA (US)

(*) Notice: Subject to any disclaimer, the term of this patent is extended or adjusted under 35 U.S.C. 154(b) by 538 days.

(21) Appl. No.: 17/725,797

(22) Filed: Apr. 21, 2022

(65) Prior Publication Data
US 2023/0342192 A1    Oct. 26, 2023

(51) Int. Cl.
*G06F 3/00* (2006.01)
*G06F 9/48* (2006.01)
(Continued)

(52) U.S. Cl.
CPC .......... *G06F 9/4881* (2013.01); *G06F 9/5038* (2013.01); *G06F 9/505* (2013.01);
(Continued)

(58) Field of Classification Search
CPC ...................................................... G06F 9/48
See application file for complete search history.

(56) References Cited

U.S. PATENT DOCUMENTS 5,627,987 A * 5/1997 Nozue ............... G06F 12/1458
                                                      711/100
6,988,139 B1 * 1/2006 Jervis ................ G06F 9/5038
                                                      709/224
(Continued)

FOREIGN PATENT DOCUMENTS

CN      1430179 A  *  7/2003  ............. G06F 21/77
CN    100444143 C  * 12/2008
(Continued)

OTHER PUBLICATIONS

David F. Ferraiolo, A Role-Based Access Control Model and Reference Implementation Within a Corporate Intranet. (Year: 1999).*
(Continued)

*Primary Examiner* — Lechi Truong
(74) *Attorney, Agent, or Firm* — Foley IP Law, PLLC (57) ABSTRACT

Solutions for distributed, decentralized traffic control for worker processes (WPs) in limited-coordination environments include: by each WP of a plurality of WPs: receiving, by the WP, indications of historical warnings corresponding to a target resource; based on at least the indications of historical warnings, autonomously determining, by the WP, whether the WP accessing the target resource would exceed a dynamic threshold of WPs permitted to access the target resource; based on at least determining that the WP accessing the target resource would exceed the dynamic threshold, not accessing the target resource by the WP; and based on at least determining that the WP accessing the target resource would not exceed the dynamic threshold, accessing the target resource, by the WP, to perform a first data management task.

20 Claims, 8 Drawing Sheets

(51) Int. Cl.
*G06F 9/50* (2006.01)
*G06F 11/32* (2006.01)

(52) U.S. Cl.
CPC .......... *G06F 9/5055* (2013.01); *G06F 11/327* (2013.01); *G06F 2209/5022* (2013.01); *G06F 2209/503* (2013.01)

(56) References Cited

U.S. PATENT DOCUMENTS

| | | | | |
|---|---|---|---|---|
| 7,072,342 | B1* | 7/2006 | Elnathan | H04L 49/9094 370/412 |
| 9,032,165 | B1* | 5/2015 | Brooker | G06F 3/0685 711/154 |
| 9,696,915 | B2* | 7/2017 | Whitney | G06F 16/13 |
| 10,182,063 | B2 | 1/2019 | Nadeau et al. | |
| 10,445,189 | B2* | 10/2019 | Masuda | G06F 3/0619 |
| 2003/0061322 | A1* | 3/2003 | Igarashi | H04L 41/22 715/736 |
| 2003/0163654 | A1* | 8/2003 | Louzoun | G06F 13/1626 711/104 |
| 2004/0158734 | A1* | 8/2004 | Larsen | G06F 21/6218 726/28 |
| 2004/0267554 | A1* | 12/2004 | Bowman | G06Q 10/10 705/321 |
| 2006/0047874 | A1* | 3/2006 | Watanabe | G06F 13/1642 710/244 |
| 2010/0205383 | A1* | 8/2010 | Blackmon | G06F 11/1666 711/149 |
| 2011/0099313 | A1* | 4/2011 | Bolanowski | G06F 9/4837 710/262 |
| 2012/0060023 | A1* | 3/2012 | Park | G06F 9/4406 713/2 |
| 2012/0131309 | A1* | 5/2012 | Johnson | G06F 9/323 712/E9.004 |
| 2012/0198568 | A1* | 8/2012 | Abuelsaad | G06Q 10/103 726/30 |
| 2012/0300260 | A1* | 11/2012 | Takizawa | G03G 15/50 358/1.16 |
| 2013/0160021 | A1* | 6/2013 | Purcell | G06F 9/4843 718/104 |
| 2015/0293709 | A1* | 10/2015 | Quach | G06F 13/1626 711/105 |
| 2017/0032123 | A1* | 2/2017 | Carson | G06F 21/52 |
| 2017/0083324 | A1* | 3/2017 | Burger | G06F 9/3858 |
| 2018/0260273 | A1* | 9/2018 | Lesartre | G06F 11/1048 |
| 2018/0268019 | A1* | 9/2018 | Rostagni | G06F 16/2365 |
| 2018/0285279 | A1* | 10/2018 | Akin | G06F 12/0888 |
| 2019/0179907 | A1* | 6/2019 | Sanders | G10L 15/22 |
| 2020/0167491 | A1* | 5/2020 | Grabois | G06F 21/568 |
| 2021/0234890 | A1 | 7/2021 | Bansal et al. | |
| 2021/0328969 | A1* | 10/2021 | Gaddam | H04L 63/102 |
| 2023/0188545 | A1* | 6/2023 | Kaciulis | H04L 63/1441 726/1 |

FOREIGN PATENT DOCUMENTS

| | | | | |
|---|---|---|---|---|
| CN | 100530120 | C * | 8/2009 | .......... G06F 11/1482 |
| CN | 105190540 | A * | 12/2015 | .......... G06F 9/30098 |
| CN | 107851118 | A * | 3/2018 | .......... H04L 67/5651 |
| JP | H0644195 | A * | 2/1994 | .......... G06F 9/542 |
| JP | 2005327007 | A * | 11/2005 | |
| JP | 2011065667 | A * | 3/2011 | |
| JP | 2011248454 | A * | 12/2011 | |

OTHER PUBLICATIONS

Asaph Azaria, MedRec: Using Blockchain for Medical Data Access and Permission Management. (Year: 2016).*

Andrew Pavlo, A Comparison of Approaches to Large-Scale Data Analysis. (Year: 2009).*

Mart'n Abadi, Access Control based on Execution History. (Year: 2003).*

"Amazon API Gateway Developer Guide", Retrieved From: https://web.archive.org/web/20220125135818/https://docs.aws.amazon.com/apigateway/latest/developerguide//apigateway-dg.pdf, Jan. 25, 2022, 400 Pages.

Dey, Abhishek, "Design a Distributed Scalable API Rate Limiter", Retrieved From: https://web.archive.org/web/20220321234627/https://systemsdesign.cloud/SystemDesign/RateLimiter, Mar. 21, 2022, 29 Pages.

"International Search Report and Written Opinion Issued in PCT Application No. PCT/US23/012453", Mailed Date: Apr. 25, 2023, 11 Pages.

\* cited by examiner

DISTRIBUTED, DECENTRALIZED TRAFFIC CONTROL FOR WORKER PROCESSES IN LIMITED-COORDINATION ENVIRONMENTS

BACKGROUND

Lifecycle management (LCM) of data in cloud environments often requires performing tasks such as moving data objects (e.g., data files) from one file directory (folder) to another, deleting, backing up, and/or compressing data, based on aspects such as age, type, file size, and others. Such LCM tasks are typically performed, for data objects on a particular target resource (e.g., cloud computing client's storage area), by one or more programs identified as worker processes (WPs), rather than by a human. This reduces the risk of human error, as well as alleviates labor burdens when the number of data objects is large. Due to the typical number of data objects in some cloud environments, the number of WPs may be relatively large.

Unfortunately, in some scenarios, the number of WPs may overwhelm a target resource by generating an excessive amount of traffic, similarly to how a distributed denial of service (DDOS) attack overwhelms a data server. When this occurs the target resource returns warnings, initially, and then errors begin occurring. In order to handle such warning/error scenarios, a master scheduler may be used to actively control the number of WPs that are permitted to access the target resource. However, the master scheduler both adds complexity and consumes resources, and so may be undesirable for some environments.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for distributed, decentralized traffic control for worker processes (WPs) in limited-coordination environments include: by each WP of a plurality of WPs: receiving, by the WP, indications of historical warnings corresponding to a target resource; based on at least the indications of historical warnings, autonomously determining, by the WP, whether the WP accessing the target resource would exceed a dynamic threshold of WPs permitted to access the target resource; based on at least determining that the WP accessing the target resource would exceed the dynamic threshold, not accessing the target resource by the WP; and based on at least determining that the WP accessing the target resource would not exceed the dynamic threshold, accessing the target resource, by the WP, to perform a first data management task.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure improve the operations of computing devices by improving efficiency of data lifecycle management (LCM) operations in cloud environments. This is achieved by enabling distributed, decentralized traffic control for worker processes (WPs), without the overhead burden and additional complexity of a centralized scheduler. Rather, each WP in a limited-coordination environments is able to autonomously decide whether its own attempts to access a target resource would likely produce errors that would degrade data LCM operations. This is achieved (at least in part) by, based on at least historical warnings from the target resource, autonomously determining, by each WP, whether the WP accessing the target resource would exceed a dynamic threshold (target number) of WPs permitted to access the target resource (i.e., the number of WPs that could access the target resource without causing congestion delays).

A distributed algorithm is used that a set of WPs is able to coordinate their activities so as not to overwhelm the target resource, which may be a cloud computing platform holding a large data set for a particular cloud computing customer. To meet constraints in the environment (e.g., simplicity, minimal overhead burden), no central authority is used, and information sharing is limited. The information needed is essentially limited to sharing the backpressure observed by each WP among the other WPs, using any efficient, available service such as a messaging system, or filesystem, or database. Examples are sufficiently robust to operate even with incomplete data.

The "high water mark" of observed backpressure is used to calculate the instantaneous size for an "elastic sliding window" (the dynamic threshold of WPs permitted to access the target resource) that grows and shrinks in response to backpressure reported from the target resource, for example in warning indications (including error messages). Each WP is able to independently determine whether its own attempts to access the target resource (thereby generating traffic) is likely to cause errors, creating a decentralized decision process without direct communication with other WPs (or any other scheduling process). The result is that the distributed decision-making generates only as much traffic as the target resource will permit, scaling up or down as more or less capacity is available in the target resource.

Figure 1:
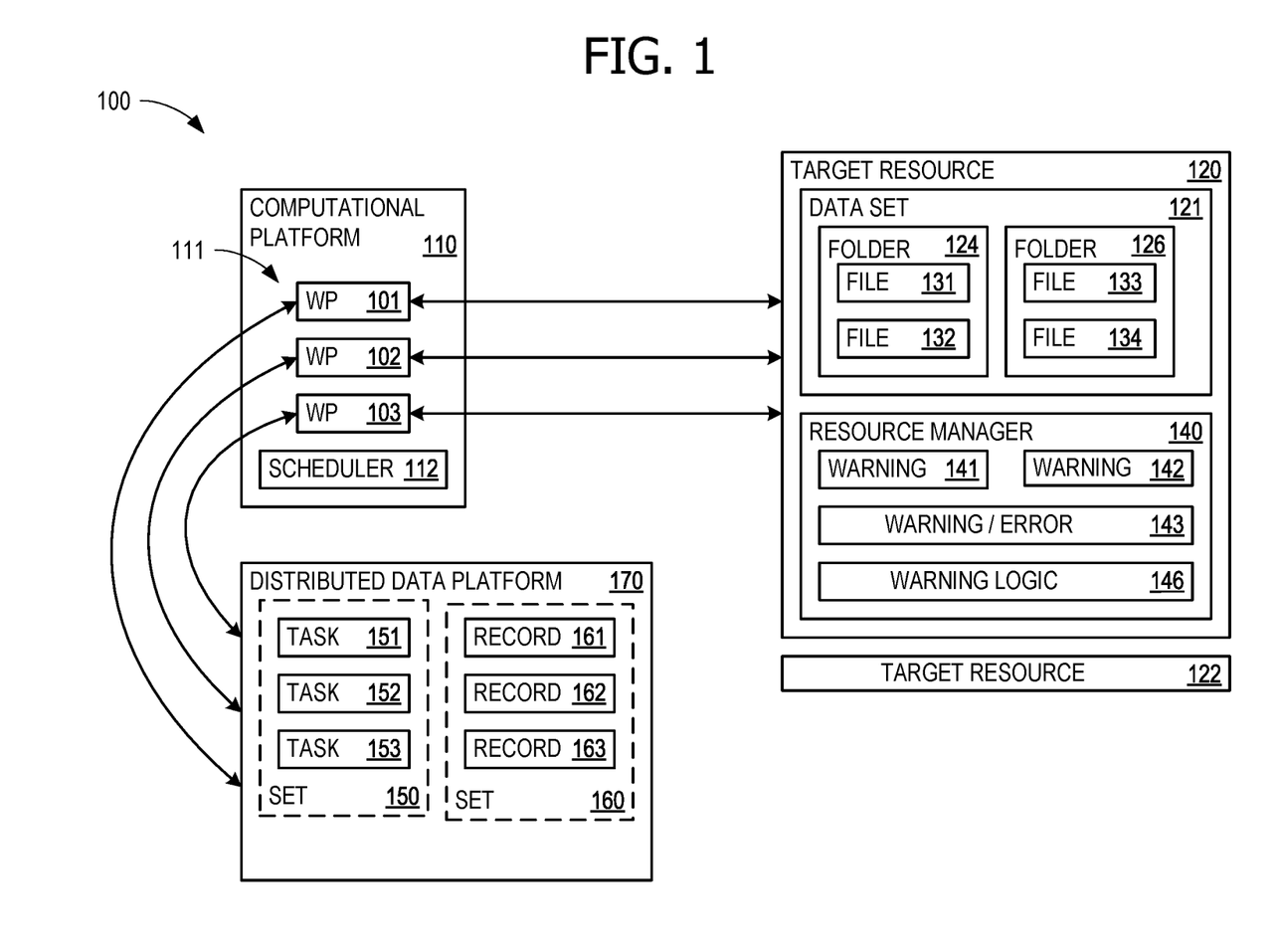
FIG. 1 illustrates an example arrangement that advantageously provides distributed, decentralized traffic control for worker processes in limited-coordination environments.

FIG. 1 illustrates an example arrangement 100 that advantageously provides distributed, decentralized traffic control for worker processes in limited-coordination environments. A target resource 120 (e.g., a cloud computing resource) hosts a data set 121 for a customer, which includes multiple files 131-134 spread among multiple folders 124 and 126. LCM operations are to move, back-up, delete, compress, or perform other tasks on files 131-134, based on customer policies and the ages and other parameters of the data. in some examples, arrangement 100 is implemented within a trusted computing environment.

A plurality of WPs 111, hosted on a computational platform 110, is used to perform the LCM operations that are identified in plurality of data management tasks 150, stored on a distributed data platform 170. Status information 200 (see FIG. 2) for plurality of data management tasks 150 is also stored on distributed data platform 170, as set of records 160. Another target resource 122 hosts another data set for another customer, and LCM operations are performed on target resource 122 separately, following the disclosure herein.

Figure 9:
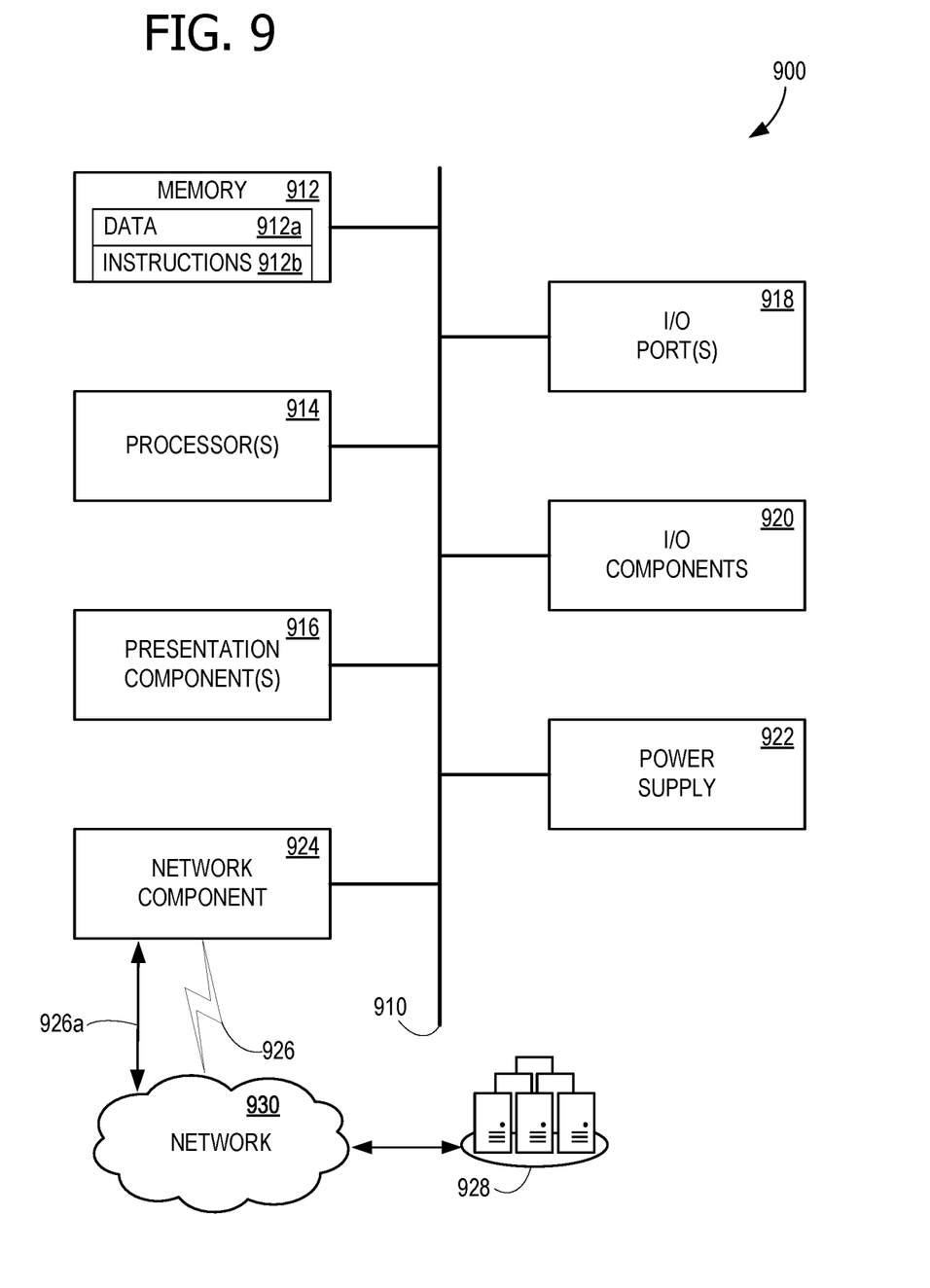
FIG. 9 is a block diagram of an example computing environment suitable for implementing some of the various examples disclosed herein.

In some examples, arrangement 100 is implemented using examples of computing device 900 of FIG. 9. For example, each of computational platform 110, target resource 120, target resource 122, and distributed data platform 170 may comprise or be executed by one or more computing devices 900. Although only three WPs, three tasks, three records, four files, and two folders are illustrated, it should be understood that examples of arrangement 100 may use larger numbers of each. Additionally, although different platforms are illustrated, a larger or smaller of platforms may be used, the components of arrangement 100 may be distributed differently than illustrated.

Plurality of WPs 111 is a pool of worker processes that select an unfinished task from among plurality of data management tasks 150, and operate on data set 121. For example, one WP may move file 131 from folder 124 to folder 126, another WP may compress file 132, another WP may archive file 133 on long term storage, and yet another WP may delete file 134. Such LCM operations are specified in plurality of data management tasks 150, for example in data management task 151, data management task 152, and/or data management task 153. In some examples, the selection of tasks includes a non-deterministic component, in order to avoid selecting tasks in incrementing order by their task identifier (task_ID).

Plurality of WPs 111 includes a WP 101, a WP 102, and a WP 103, which may be similar in architecture and operation. WP 101 is illustrated in further detail in FIG. 4. A scheduler 112 wakes up each of WPs 101-103, and each WP then selects a task to perform. If the number of WPs operating simultaneously generate too much traffic for target resource 120 to handle, target resource 120 will become overwhelmed and begin returning errors. This will slow down or halt the progress of the LCM operations. This condition may occur even if scheduler 112 wakes up each of WPs 101-103 at separate times, such that the different WPs start at different times. In some examples, scheduler 112 is a local scheduler that wakes up WPs and sets up tasks, but otherwise does not participate in throttling or scheduling WP activities on tasks.

If the response of a WP is to merely sleep for a time interval and restart (e.g., using a "sleep( )" method), the congestion condition may be repeated after the time interval lapses. Thus, the solutions disclosed herein identify the point of diminishing returns (e.g., another worker actually slows the progress of LCM operations, rather than speeding it up), and backs down the number of WPs accessing target resource simultaneously. This helps optimize the number of WPs that are operating concurrently, maximizing the rate of progress for the LCM operations.

A resource manager 140 has warning logic 146 that senses conditions for target resource 120 and returns warnings of appropriate severity. A warning type 141 may be at a lowest tier (e.g., a soft throttle warning), and may indicate that the traffic exceeds a level specified in the customer's resource profile. A warning type 142 may be a higher tier (e.g., a hard warning based on the capacity of target resource 120). A warning type 143 may be an actual error (e.g., an error message indicating that an error has occurred). In some examples, warning types 141 and 142 include a predicted likelihood of an error occurring if traffic remains at the same level (e.g., a warning type 141 may identify a 10% chance of an error, and a warning type 141 may identify a 15% chance of an error). Warnings may be considered as "throttling signals" that may be leveraged by each of WPs 101-103 to determine whether to throttle back activity or proceed with a task.

Set of records 160 provides checkpoint records and includes a record 161, a record 162, and a record 163. Records 161, 162, and 163 were each generated for different tasks, likely by multiple different WPs. Record 161 is illustrated in further detail in FIG. 2, and records 162 and 163 are similar. Set of records 160 may be implemented using a distributed database (e.g., a NoSQL database), a distributed messaging queue, a filesystem, a shared scoreboard, or any other mechanisms that is able to maintain at least the most recent version of a message from each WP. Some examples may use an Azure table, REDIS or MemCache.

Figure 2:
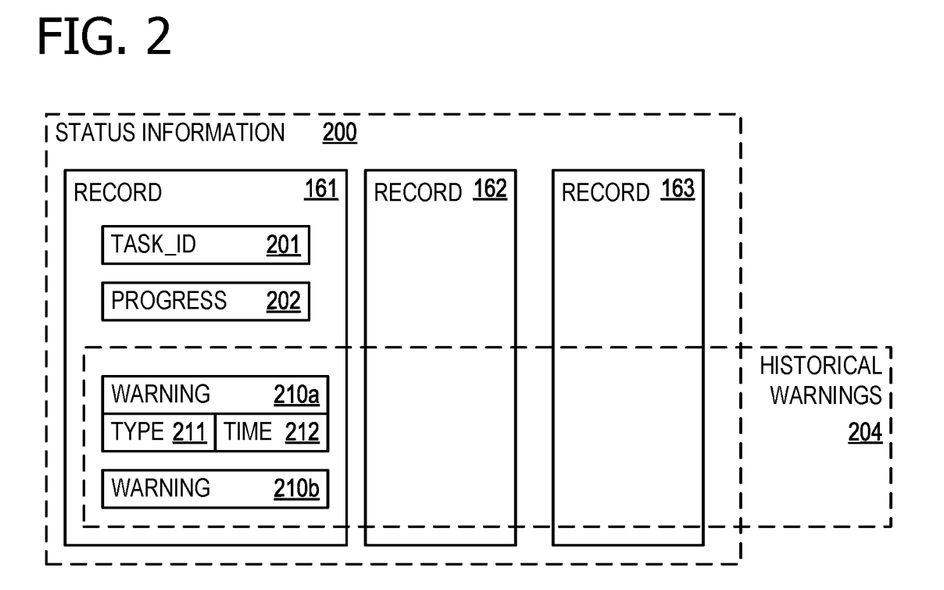
FIG. 2 illustrates additional detail for exemplary stored records used in some examples of the arrangement of FIG. 1.

FIG. 2 illustrates additional detail for record 161. Record 161, along with the other records (161-162) form status information 200. Status information 200 spans set of records 160. Within record 161 is a task_ID 201, and a progress indication 202. Each data management task 151-153 has a unique data management task identifier, for example data management task 151 has task_ID 201. Each data management task 151-153 also has a corresponding checkpoint record, for example data management task 151 has record 161.

Progress indication 202 in record 161 (for data management task 151) indicates how much progress has been made on data management task 151. Initially, progress indications in each record start out at 0%, and when reaching 100% indicate that the corresponding data management task is completed. If a data management task is interrupted prior to completion (e.g., the WP performing the data management task receives an error and aborts operation, as described below), the progress that has already been made for that data management task is stored. This may be used to identify where to restart that data management task, when it is safe for a WP to access target resource 120 again. (See FIG. 3)

For example, progress indication 202 indicates the cumulative progress that has already been made on data management task 151.

As illustrated, record 161 also holds a historical warning indication 210a and a historical warning indication 210b. Historical warning indication 210a, which has a warning type 211 that may be any of warning types 141-143 (whichever was sent by resource manager 140 in target resource 120). Historical warning indication 210a also has an age, indicated by a timestamp 212. Warning age is used to determine the relevance of a historical warning indication, because warnings over a certain age may be too old and no longer relevant (e.g., the historical warning indication will eventually expire). Historical warning indication 210b is structured similarly to historical warning indication 210a, although it may have a different warning type. Expirations times may differ for different warning types.

Together, historical warning indications 210a and 210b, along with historical warning indications in records 162 and 163 form indications of historical warnings 206. In some implementations, only the most recent warning of each type is retained in each record. As described below, in relation to FIG. 5, indications of historical warnings 206, which spans all of records 161-163 are retrieved (received) by each WP that is attempting to independently (autonomously) determine whether to perform a data management task or, instead, to forego accessing target resource 120.

Figure 3:
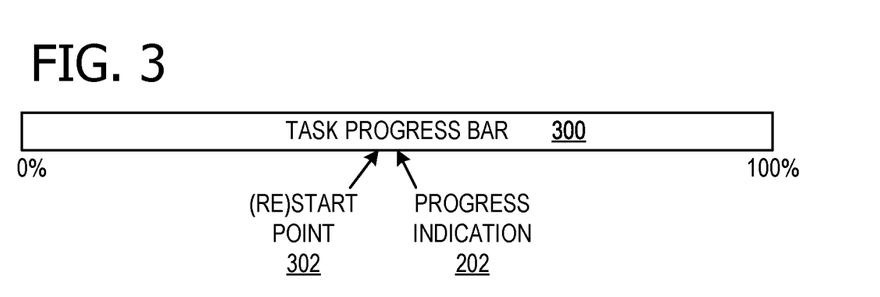
FIG. 3 shows a notional view of a task restart, as may occur with some examples of the arrangement of FIG. 1.

FIG. 3 shows a notional view of a task restart. A notional task progress bar 300 is shown with a 0% start and a 100% completion. In operation, progress bar 300 will not be shown (unless a human is monitoring task progress on a user interface), although it is useful to illustrate a starting point 301 for data management task 151. Starting point 302 may be a restarting point, if data management task 151 had previously been started and aborted. Starting point 302 may be at or prior to progress indication 202, based on the nature of the task. Some tasks may require complete restart, some tasks may require repetition of some portion, and some tasks may be restarted at exactly the point of last reported progress.

Figure 4:
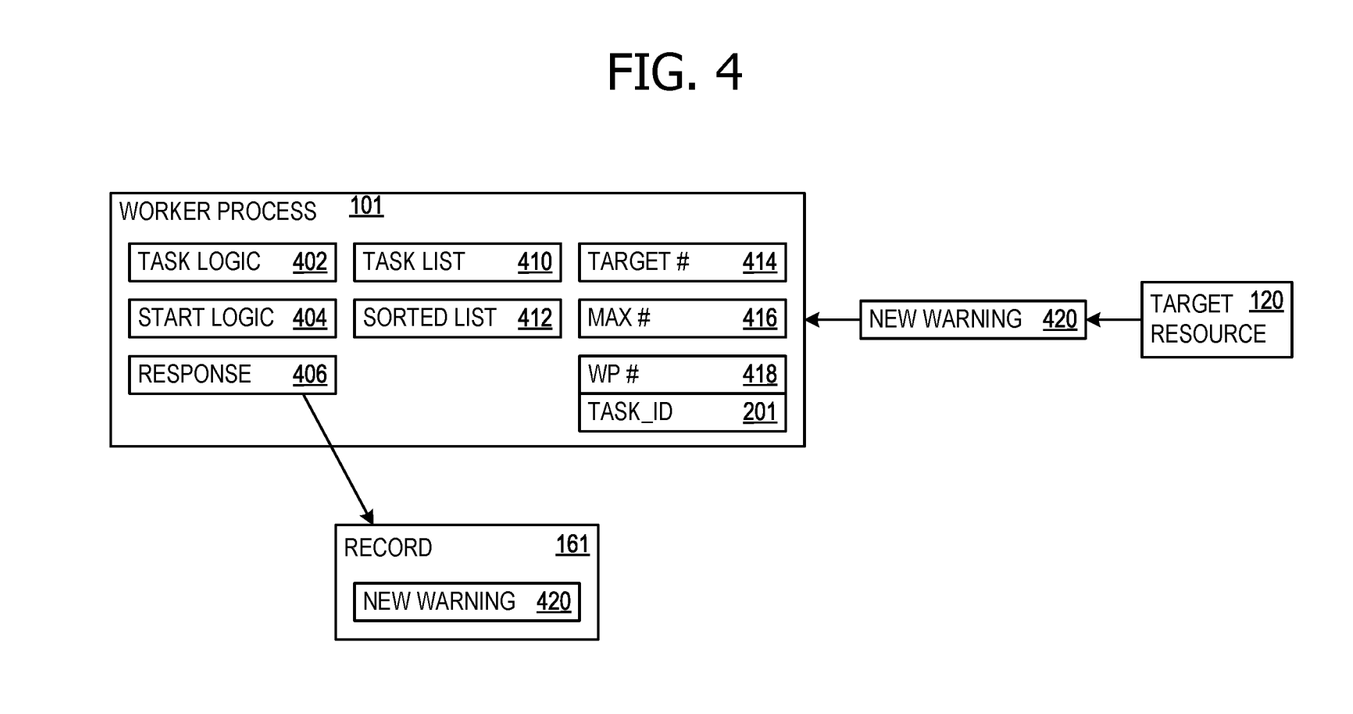
FIG. 4 illustrates additional detail for exemplary worker processes (WPs) used in some examples of the arrangement of FIG. 1.

FIG. 4 illustrates additional detail for WP 101; other WPs 102 and 103 are similarly configured. WP 101 has task logic 402 to perform the LCM operations, such as moving, compressing, deleting, and/or other operations that may be performed on files 131-134 and/or folders 124 and 126. Start logic 404 autonomously determines whether WP 101 accessing target resource 120 would exceed the determined traffic handling capacity of target resource 120 (e.g. the dynamic threshold, or target number of WPs permitted to access target resource 120). The operation of start logic 404 is described, in part, with flowchart 600 of FIG. 6.

Response logic 406 handles the response of WP 101 to an incoming new warning indication 420 from target resource 120. For example, response logic 406 persists (stores) new warning indication 420 in record 161, where it will become a historical warning indication when another WP reads it at a later time.

Figure 6:
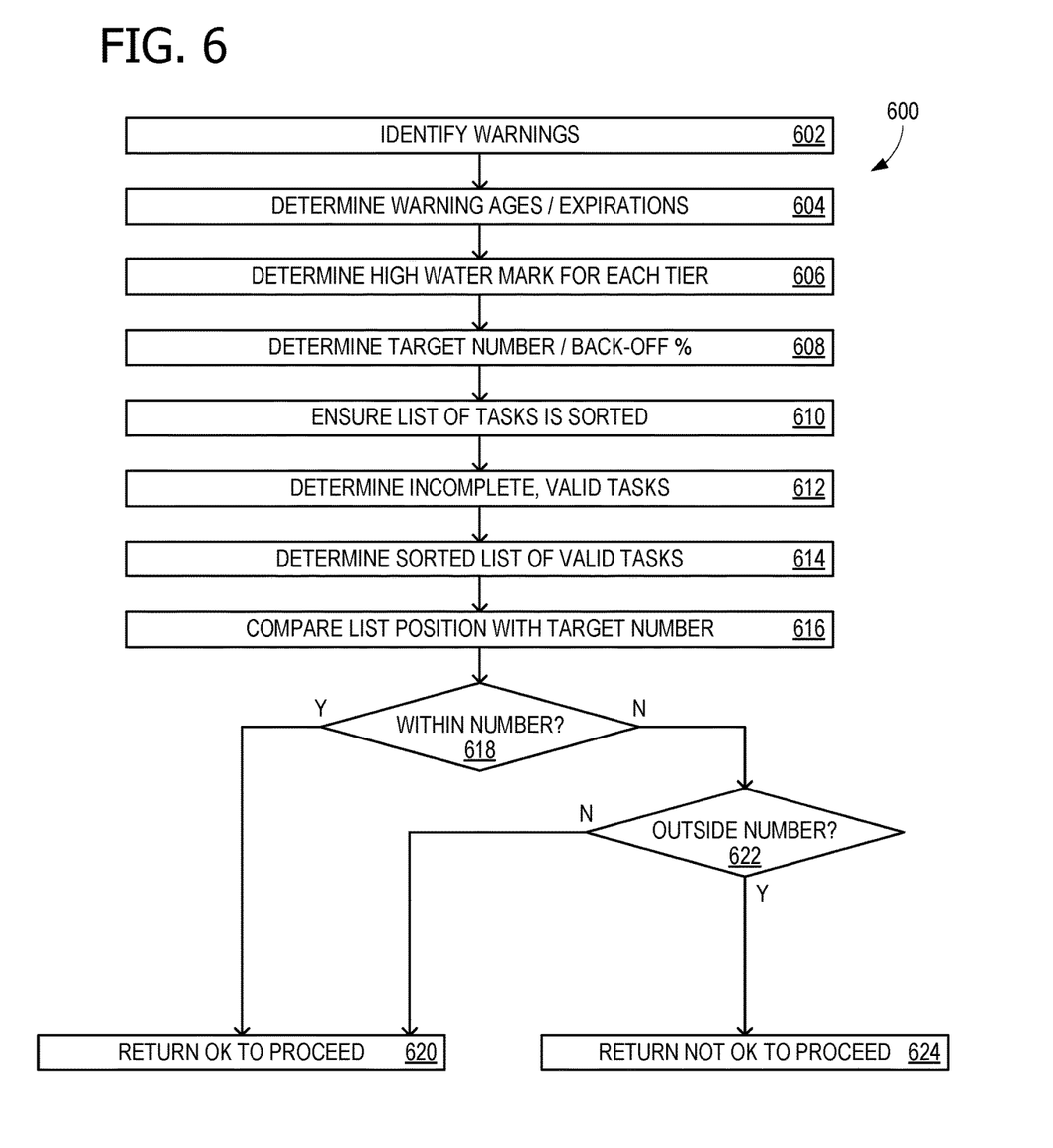
FIG. 6 shows another flowchart illustrating exemplary operations associated with some examples of the arrangement of FIG. 1.

WP 101 assembles a task list of data management tasks 151-153, and trims that down to a sorted list of valid data management tasks 412, as described in relation to FIG. 6. In order to determine whether to perform a task, WP 101 uses a dynamic threshold 414, and a predetermined maximum number 416. An example calculation using these values is described in relation to FIG. 6. WP 101 also has its own reference identifier 418, which ins some examples, is copied from task_ID 201.

Figure 5:
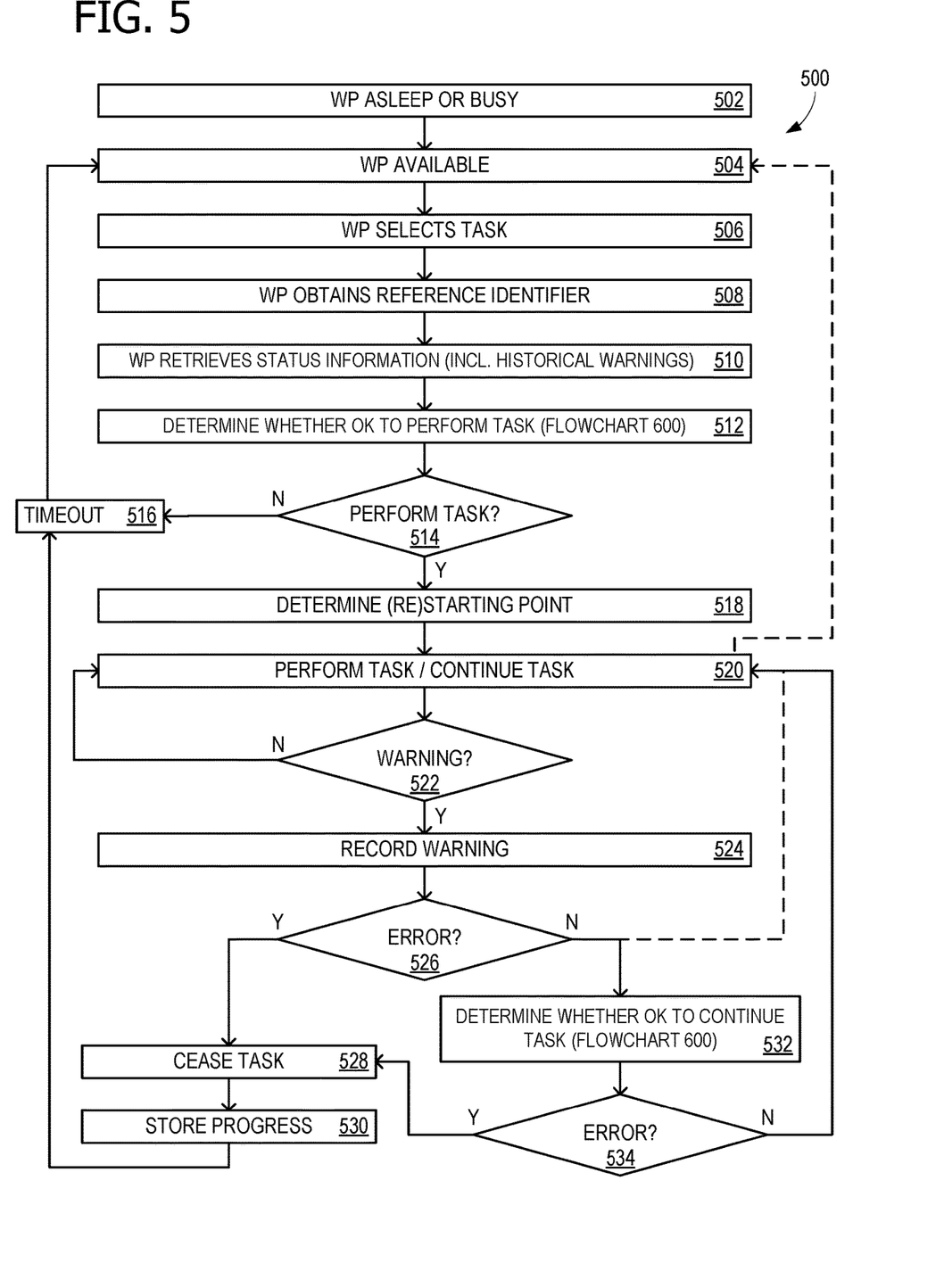
FIG. 5 shows a flowchart illustrating exemplary operations associated with some examples of the arrangement of FIG. 1.

FIG. 5 shows a flowchart 500 illustrating exemplary operations associated with examples of arrangement 100. Flowchart 500 is performed independently by each WP of plurality of WPs 111. In some examples, operations described for flowchart 500 are performed by computing device 900 of FIG. 9. Flowchart 500 commences with WP 101 being in a sleep state or busy (e.g., performing an LCM task on target resource 122) at 502. WP 101 becomes available at 504. For example scheduler 112 may initiate WP 101 (e.g., wake up WP 101), WP 101 may have become idle after completing or aborting a task on another target resource (e.g., target resource 122), WP 101 may be waking up after a timer lapse, or some other condition may have occurred. In some examples, scheduler 112 starts up WPs at intervals that may be somewhat random, although scheduler 120 does not control whether any WP of plurality of WPs 111 accesses target resource 120 to perform a data management task.

In operation 506 WP 101 selects data management task 151 from among plurality of data management tasks 150. In some examples, the selection is random. In operation 508, WP 101 determines own reference identifier 418. In some examples, reference identifier 418 is based on at least a data management task identifier (e.g., task_ID 201) associated with data management task 151. For example, reference identifier 418 may be set to task_ID 201.

Operation 510 retrieving status information 200 for plurality of data management tasks 150. Plurality of data management tasks 150 includes data management task 151, and status information 200 for plurality of data management tasks 150 comprises indications of historical warnings 206. Status information comprises plurality of records 160. Each record of plurality of records 160 corresponds to a data management tasks of plurality of data management tasks 150. Operation 510 includes receiving, by WP 101, indications of historical warnings 206 from target resource 120. In some examples, status information 200 is retrieved from a distributed database or a distributed messaging queue.

Operation 512 includes, based on at least indications of historical warnings 206, autonomously determining, by WP 101, whether WP 101 accessing target resource 120 would exceed dynamic threshold 414 of WPs permitted to access target resource 120. This is performed without WP 101 receiving dynamic threshold 414 from another process. Further detail on operation is provided in flowchart 600 of FIG. 6. Decision operation 514 implements the result of operation 512 (flowchart 600).

Flowchart 500 moves to operation 516 based on at least determining that WP 101 accessing target resource 120 would exceed dynamic threshold 414, and WP 101 does not accessing target resource 120. Rather, WP 101 may go into a sleep state (after which it times out and wakes up again), or performs tasks on another target resource (after which it may return at a later time to attempt performing a task on target resource 120). Flowchart 500 then moves back to operation 504 when WP 101 becomes available again.

Otherwise, Flowchart 500 moves to operation 518 based on at least determining that WP 101 accessing target resource 120 would not exceed dynamic threshold 414. Operation 518 includes determining, from status information 200, starting point 302 for data management task 151. In operation 520, WP 101 accessing target resource 120 to perform data management task 151. Performing data management task 151 comprises starting data management task 151 from starting point 302. When data management task 151 completes, flowchart 500 returns to operation 504 (shown in a dashed line), and WP 101 becomes available to pick up another task.

While WP 101 is performing data management task 151 (prior to data management task 151 completing), decision operation 522 determines whether a warning (e.g., new warning indication 420) is received from target resource 120. If not, flowchart continues with operation 520 until data management task 151 is completed. At that point, flowchart 500 returns to operation 504 for WP 101 to begin another task.

Otherwise, if a warning is received, operation 524 includes, based on at least receiving new warning indication 420 from target resource 120, persisting new warning indication 420 in record 161 corresponding to data management task 151. This may also be viewed as, based on at least receiving new warning indication 420 from target resource 120, persisting new warning indication 420 in status information 200—or, based on at least receiving new warning indication from target resource 120, persisting new warning indication 420 in indications of historical warnings 206. In some examples, only the most recent warning of each type is retained, and earlier warnings of the same type, in the same record, are discarded.

Decision operation 526 determines whether new warning indication 420 is an error or a lower tier warning type. If an error, operation 528 causes WP 101 to cease performing data management task 151. That is, operation 528 includes, based on at least receiving, from target resource 120, new warning indication 420 indicating an error condition, ceasing to perform data management task 151. Operation 530 stores (persists) progress indication 202 for data management task 151 in record 161, in status information 200. Flowchart 500 then moves to operation 516.

Otherwise, if not an error condition, some examples of flowchart 500 return to operation 520, and WP 101 continues performing data management task 151 uninterrupted (shown in a dashed line). However, in some examples, flowchart 500 moves on to operation 532. Operation 532 includes, based on at least receiving, from target resource 120, new warning indication 420 other than an error condition, autonomously determining, by WP 101, whether WP 101 continuing to access target resource 120 would exceed a new dynamic threshold 414 of WPs permitted to access target resource 120. This is also performed using flowchart 600.

Decision operation 534 implements the determination of operation 532. If it is safe to continue the task, flowchart returns to operation 520. That is, based on at least determining that WP 101 continuing to access target resource 120 would not exceed the new dynamic threshold 414, operation 520 continues to perform data management task 151. Otherwise, based on at least determining that WP 101 continuing to access target resource 120 would exceed the new dynamic threshold, flowchart 500 moves to operation 528 and WP 101 ceases to perform data management task 151. WP 101 then stores progress indication 202 for data management task 151 in status information 200, in operation 530, before moving to operation 516.

FIG. 6 shows a flowchart 600 illustrating exemplary operations associated with examples of arrangement 100. In some examples, operations described for flowchart 600 are performed by computing device 900 of FIG. 9. Flowchart 600 commences with operation 602, which identifies warnings (e.g., historical warning indications 210*a* and 210*b*) in indications of historical warnings 206. In some examples, historical warning indications 210*a* and 210*b* comprise multiple tiers of warning significance. In some examples, historical warning indications 210*a* and 210*b* comprise three tiers of warning significance. In some examples, historical warning indications 210*a* and 210*b* comprise include at least one warning indication selected from the list consisting of a low tier warning, a higher tier warning, and an error condition.

Operation 604 determines warning ages, and includes, based on at least an age of a historical warning indication, determining a relevance of the historical warning indication. Based on at least an age of a historical warning indication, the historical warning indication is either included in or excluded from the determination of whether WP 101 accessing target resource 120 would exceed dynamic threshold 414.

Each record has its own high water mark (the highest reported percentage of likelihood of an error) for each type of warning, and each type of warning has its own high water mark across all of the records. Operation 606 determines the high water mark of the high water marks (across the records), for each warning type.

In operation 608, WP 101 autonomously determines (e.g., independently calculates) dynamic threshold 414. Operation 608 may be performed either by calculating a number to use, or a percentage to back off from a maximum. Because the math is linear arithmetic both calculation approaches are equivalent.

If there are any errors (warning type 143), calculate dynamic threshold 414 using the number of errors as: dynamic threshold 414 (target #in Eq. 1) equals predetermined maximum number 416 minus the number of records having at least one error younger than the maximum age (e.g., non-expiration age):

$$\text{target \#} = \text{maximum \#} - \text{\#records having at least one error} \qquad \text{Eq. (1)}$$

Or, calculate the percentage of records having at least one error younger than a maximum age. Set this equal to a back-off percentage. With this approach, dynamic threshold 414 equals predetermined maximum number 416 multiplied by the back-off percentage:

$$\text{target \#} = \text{maximum \#} \times (1 - \text{backoff \%}) \qquad \text{Eq. (2)}$$

If there are no errors, but there are higher tier warnings (warning type 142), calculate dynamic threshold 414 using the highest percentage in a higher tier warning that is younger than the maximum age. Set this highest percentage equal to the back-off percentage and use Equation (2). If there are no errors, and no higher tier warnings, but there are lowest tier warnings (warning type 141), use the same approach as for the higher tier warnings.

If there are no warnings, the predetermined maximum number of WPs may be used. For example, with a predetermined maximum number of 20, if there is one error, the back off percentage will be 5% (1 of 20). The dynamic threshold will be 19 (20−1 or 20×95%). Or, if starting with a predetermined maximum number of 20, if the highest warning percentage is 15%, the back off percentage will be 15% (3 of 20). The dynamic threshold will be 17 (20×85%).

Operation 610 ensures the plurality of data management task identifiers is sorted. If the list is not already sorted, operation 610 sorts the plurality of data management task identifiers. Operation 612 determines which data management task identifiers of the plurality of data management task identifiers correspond to incomplete data management tasks, invalid data management tasks or data management tasks otherwise not available for processing. Based on at least sorting of the plurality of data management task identifiers and determining which data management task identifiers of the plurality of data management task identifiers correspond to incomplete data management tasks (e.g., what remains after operation 612), operation 614 determines sorted list of valid data management tasks 412.

In operation 616, WP 101 compares position 706 of its own reference identifier 418, on sorted list of valid data management tasks 412, with dynamic threshold 414. Decision operation 618 determines whether position 706 is within dynamic threshold 414 of the start (top, beginning) of sorted list of valid data management tasks 412. If so, operation 620 returns the result that WP 101 accessing target resource 120 would not exceed dynamic threshold 414. If not decision operation 622 determines whether position 706 is past (outside, beyond) dynamic threshold 414 of the start of sorted list of valid data management tasks 412. If so, operation 624 return that WP 101 accessing target resource 120 would exceed dynamic threshold 414.

In some scenarios, WP 101 will not find its own reference identifier 418 within sorted list of valid data management tasks 412, either within or past dynamic threshold 414. In such scenarios, the default may be either WP 101 executes the task (and deals with errors, if any arise), or to abort.

Figure 7A:
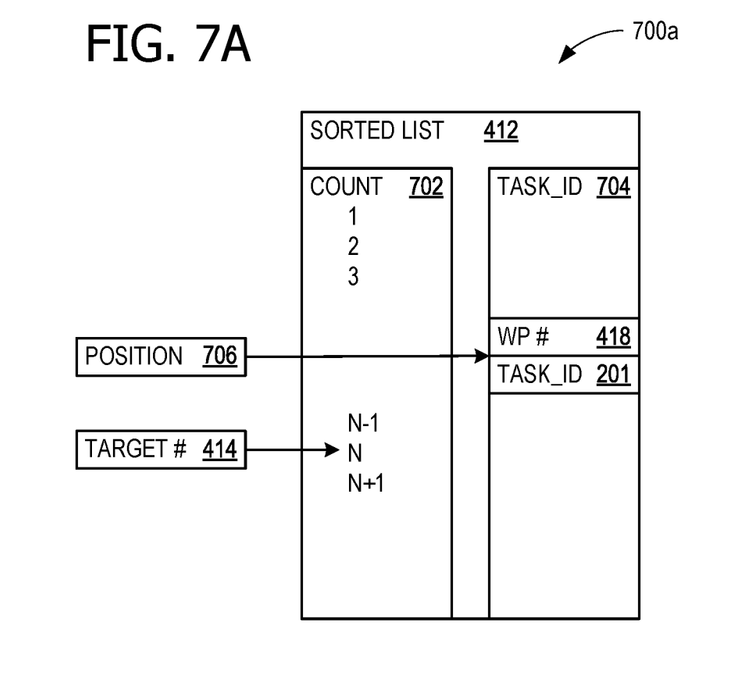
FIG. 7A illustrates one scenario that may occur during the operation of the flowchart of FIG. 6.

FIG. 7A illustrates one scenario 700a that may occur during the operation of the flowchart of FIG. 6. Sorted list of valid data management tasks 412 is shown with a task count column 702 and a task_ID column 704, although task count column 702 may not actually exist, but is used for the purpose of illustration. Task count column 702 increments from 1 to the number of tasks. Task_ID column 704 has the tasks which, although sorted, are unlikely to be incrementing by one, given their random nature and large number of digits. Nevertheless, in the illustrated example, they are sorted in ascending order, based on their Task_ID.

Reference identifier 418 for WP 101 (taken as task_ID 201, in this example) is at a position 706 in sorted list of valid data management tasks 412. Dynamic threshold 414 is past position 706, meaning that position 706 is within (below) dynamic threshold 414. This is an indication that WP 101 may access target resource 120.

Figure 7B:
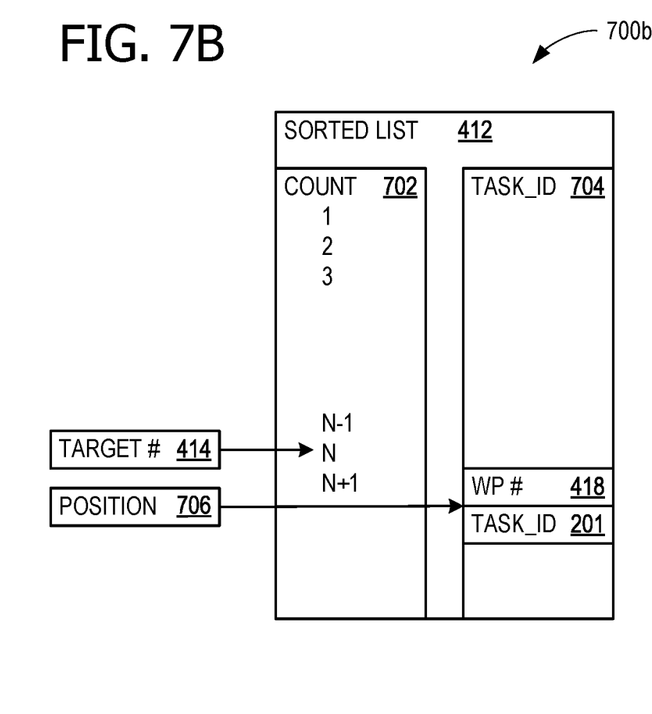
FIG. 7B illustrates another scenario that may occur during the operation of the flowchart of FIG. 6.

FIG. 7B illustrates another scenario 700b that may occur during the operation of the flowchart of FIG. 6. In scenario 700b, however, position 706 is past dynamic threshold 414, meaning that position 706 is outside (above) dynamic threshold 414. This is an indication that WP 101 should not access target resource 120.

Figure 8:
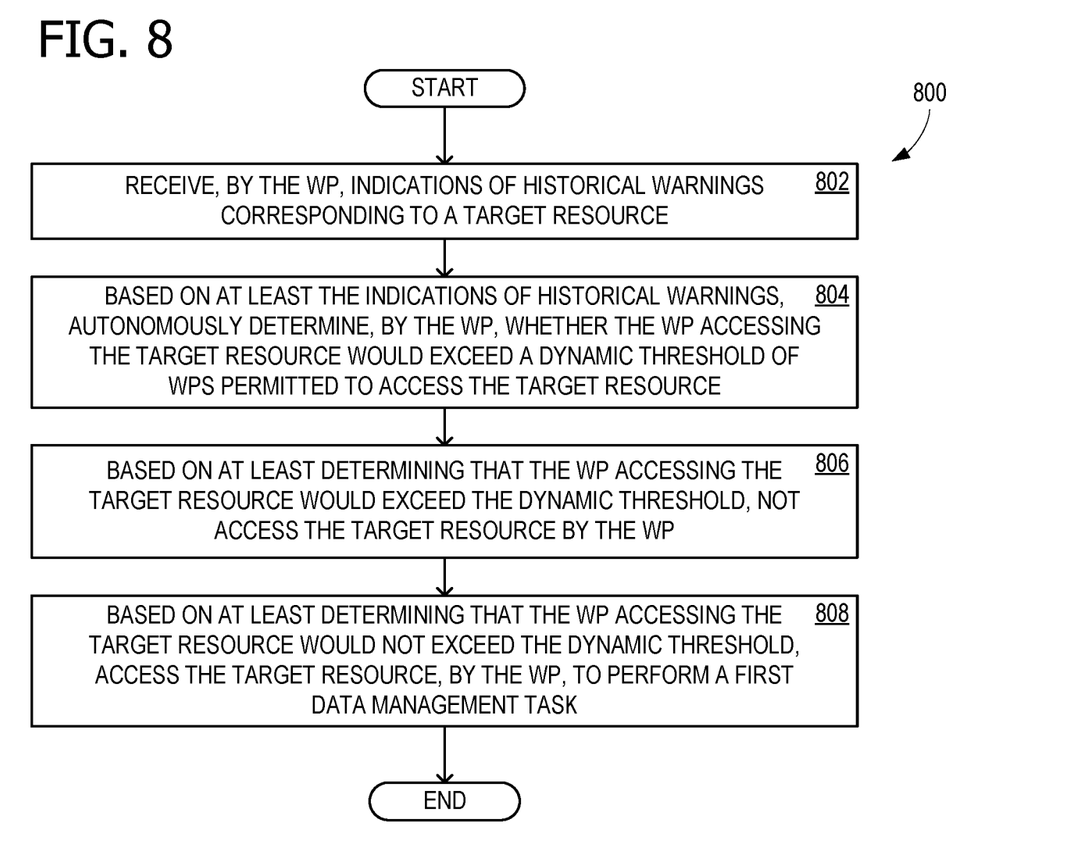
FIG. 8 shows another flowchart illustrating exemplary operations associated with some examples of the arrangement of FIG. 1.

FIG. 8 shows a flowchart 800 illustrating exemplary operations associated with arrangement 100. In some examples, operations described for flowchart 800 are performed by computing device 900 of FIG. 9. Flowchart 800 is performed independently by each WP of a plurality of WPs and commences with operation 802, which includes receiving, by the WP, indications of historical warnings corresponding to a target resource. Operation 804 includes, based on at least the indications of historical warnings, autonomously determining, by the WP, whether the WP accessing the target resource would exceed a dynamic threshold of WPs permitted to access the target resource. Operation 804 includes, based on at least determining that the WP accessing the target resource would exceed the dynamic threshold, not accessing the target resource by the WP. Operation 808 includes, based on at least determining that the WP accessing the target resource would not exceed the dynamic threshold, accessing the target resource, by the WP, to perform a first data management task.

Additional Examples

An example system comprises: a processor; and a computer-readable medium storing instructions that are operative upon execution by the processor to: by each WP of a plurality of WPs: receive, by the WP, indications of historical warnings corresponding to a target resource; based on at least the indications of historical warnings, autonomously determine, by the WP, whether the WP accessing the target resource would exceed a dynamic threshold of WPs permitted to access the target resource; based on at least determining that the WP accessing the target resource would exceed the dynamic threshold, not access the target resource by the WP; and based on at least determining that the WP accessing the target resource would not exceed the dynamic threshold, access the target resource, by the WP, to perform a first data management task.

An example method comprises: by each WP of a plurality of WPs: receiving, by the WP, indications of historical warnings corresponding to a target resource; based on at least the indications of historical warnings, autonomously determining, by the WP, whether the WP accessing the target resource would exceed a dynamic threshold of WPs permitted to access the target resource; based on at least determining that the WP accessing the target resource would exceed the dynamic threshold, not accessing the target resource by the WP; and based on at least determining that the WP accessing the target resource would not exceed the dynamic threshold, accessing the target resource, by the WP, to perform a first data management task.

One or more example computer storage devices hags computer-executable instructions stored thereon, which, upon execution by a computer, cause the computer to perform operations comprising: by each WP of a plurality of WPs: receiving, by the WP, indications of historical warnings corresponding to a target resource; based on at least the indications of historical warnings, autonomously determining, by the WP, whether the WP accessing the target resource would exceed a dynamic threshold of WPs permitted to access the target resource; based on at least determining that the WP accessing the target resource would exceed the dynamic threshold, not accessing the target resource by the WP; and based on at least determining that the WP accessing the target resource would not exceed the dynamic threshold, accessing the target resource, by the WP, to perform a first data management task.

Alternatively, or in addition to the other examples described herein, examples include any combination of the following:
based on at least receiving a new warning indication from the target resource, persisting the new warning;
autonomously determining, by the WP, whether the WP accessing the target resource would exceed a dynamic threshold of WPs permitted to access the target resource comprises autonomously determining, by the WP, the dynamic threshold;
determining a starting point for the first data management task, wherein performing the first data management task comprises starting the first data management task from the determined starting point;
sorting a plurality of data management task identifiers;
determining which data management task identifiers of the plurality of data management task identifiers correspond to incomplete data management tasks;
based on at least sorting of the plurality of data management task identifiers and determining which data management task identifiers of the plurality of data management task identifiers correspond to incomplete data management tasks, determining the sorted list of valid data management tasks.

autonomously determining, by the WP, whether the WP accessing the target resource would exceed the dynamic threshold comprises the determining whether the WP accessing the target resource would exceed the dynamic threshold without receiving the dynamic threshold from another process;

retrieving status information for a plurality of data management tasks, wherein the plurality of data management tasks includes the first data management task, and wherein the status information for a plurality of data management tasks comprises the indications of historical warnings;

based on at least receiving, from the target resource, a new warning indication other than an error condition, autonomously determining, by the WP, whether the WP continuing to access the target resource would exceed a new dynamic threshold of WPs permitted to access the target resource;

based on at least determining that the WP continuing to access the target resource would exceed the new dynamic threshold, ceasing to perform the first data management task; and based on at least determining that the WP continuing to access the target resource would not exceed the new dynamic threshold, continuing to perform the first data management task.

While the aspects of the disclosure have been described in terms of various examples with their associated operations, a person skilled in the art would appreciate that a combination of operations from any number of different examples is also within scope of the aspects of the disclosure.

Example Operating Environment

FIG. 9 is a block diagram of an example computing device 900 for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more busses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer-storage memory," "memory," and "memory devices" are synonymous terms for the computer-storage memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represent an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

The computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:
1. A system comprising:
   a processor; and a computer-readable medium storing instructions that are operative upon execution by the processor to:
by each worker process (WP) of a plurality of WPs:
select, by the WP from a plurality of data management tasks, a selected data management task;
determine, from a task record associated with the selected data management task, a restart point;
receive, by the WP, indications of historical warnings corresponding to performing the selected data management task at a target resource;
based on at least the indications of historical warnings, autonomously determine, by the WP, a dynamic threshold of WPs permitted to access the target resource;
determine, by the WP, a sorted list comprising valid management tasks of the plurality of data management tasks;
determine, by the WP, whether the WP accessing the target resource would exceed the dynamic threshold of WPs permitted to access the target resource by comparing a position value of the selected data management task on the sorted list to the dynamic threshold;
based on at least determining that the WP accessing the target resource would exceed the dynamic threshold by determining that the position value is above the dynamic threshold, not access the target resource by the WP;
based on at least determining that the WP accessing the target resource would not exceed the dynamic threshold by determining that the position value is below the dynamic threshold, access the target resource, by the WP, to perform the selected data management task; and
resume execution of the selected data management task from the restart point.

2. The system of claim 1, wherein the instructions are further operative to:
based on at least receiving a new warning indication from the target resource, persist the new warning indication.

3. The system of claim 1, wherein autonomously determining, by the WP, whether the WP accessing the target resource would exceed the dynamic threshold of WPs permitted to access the target resource comprises:
autonomously determining, by the WP, the dynamic threshold.

4. The system of claim 1, wherein the instructions are further operative to:
determine a starting point for the selected data management task, wherein performing the selected data management task comprises starting the selected data management task from the determined starting point.

5. The system of claim 1, wherein autonomously determining, by the WP, whether the WP accessing the target resource would exceed the dynamic threshold comprises the determining whether the WP accessing the target resource would exceed the dynamic threshold without receiving the dynamic threshold from another process.

6. The system of claim 1, wherein the instructions are further operative to:
retrieve status information for the plurality of data management tasks, wherein the plurality of data management tasks includes the selected data management task, and wherein the status information for the plurality of data management tasks comprises the indications of historical warnings.

7. The system of claim 1, wherein the instructions are further operative to:
based on at least receiving, from the target resource, a new warning indication other than an error condition, autonomously determining, by the WP, whether the WP continuing to access the target resource would exceed a new dynamic threshold of WPs permitted to access the target resource;
based on at least determining that the WP continuing to access the target resource would exceed the new dynamic threshold, ceasing to perform the selected data management task; and
based on at least determining that the WP continuing to access the target resource would not exceed the new dynamic threshold, continuing to perform the selected data management task.

8. A method comprising:
by each worker process (WP) of a plurality of WPs:
selecting, by the WP from a plurality of data management tasks, a selected data management task;
determining, from a task record associated with the selected data management task, a restart point;
receiving, by the WP, indications of historical warnings corresponding to performing the selected data management task at a target resource;
based on at least the indications of historical warnings, autonomously determining, by the WP, a dynamic threshold of WPs permitted to access the target resource;
determining, by the WP, a sorted list comprising valid management tasks of the plurality of data management tasks;
determining, by the WP, whether the WP accessing the target resource would exceed the dynamic threshold of WPs permitted to access the target resource by comparing a position value of the selected data management task on the sorted list to the dynamic threshold;
based on at least determining that the WP accessing the target resource would exceed the dynamic threshold by determining that the position value is above the dynamic threshold, not accessing the target resource by the WP;
based on at least determining that the WP accessing the target resource would not exceed the dynamic threshold by determining that the position value is below the dynamic threshold, accessing the target resource, by the WP, to perform the selected data management task; and
resuming execution of the selected data management task from the restart point.

9. The method of claim 8, further comprising:
based on at least receiving a new warning indication from the target resource, persisting the new warning indication.

10. The method of claim 8, wherein autonomously determining, by the WP, whether the WP accessing the target resource would exceed the dynamic threshold of WPs permitted to access the target resource comprises:
autonomously determining, by the WP, the dynamic threshold.

11. The method of claim 8, further comprising:
determining a starting point for the selected data management task, wherein performing the selected data management task comprises starting the selected data management task from the determined starting point.

12. The method of claim 8, wherein autonomously determining, by the WP, whether the WP accessing the target resource would exceed the dynamic threshold comprises the determining whether the WP accessing the target resource would exceed the dynamic threshold without receiving the dynamic threshold from another process.

13. The method of claim 8, further comprising:
retrieving status information for the plurality of data management tasks, wherein the plurality of data management tasks includes the selected data management task, and wherein the status information for the plurality of data management tasks comprises the indications of historical warnings.

14. The method of claim 8, further comprising:
based on at least receiving, from the target resource, a new warning indication other than an error condition, autonomously determining, by the WP, whether the WP continuing to access the target resource would exceed a new dynamic threshold of WPs permitted to access the target resource;
based on at least determining that the WP continuing to access the target resource would exceed the new dynamic threshold, ceasing to perform the selected data management task; and
based on at least determining that the WP continuing to access the target resource would not exceed the new dynamic threshold, continuing to perform the selected data management task.

15. One or more non-transitory computer storage devices having computer-executable instructions stored thereon, which, upon execution by a computer, cause the computer to perform operations comprising:
by each worker process (WP) of a plurality of WPs:
selecting, by the WP from a plurality of data management tasks, a selected data management task;
determining, from a task record associated with the selected data management task, a restart point;
receiving, by the WP, indications of historical warnings corresponding to performing the selected data management task at a target resource;
based on at least the indications of historical warnings, autonomously determining, by the WP, a dynamic threshold of WPs permitted to access the target resource;
determining, by the WP, a sorted list comprising valid management tasks of the plurality of data management tasks;
determining, by the WP, whether the WP accessing the target resource would exceed the dynamic threshold of WPs permitted to access the target resource by comparing a position value of the selected data management task on the sorted list to the dynamic threshold;
based on at least determining that the WP accessing the target resource would exceed the dynamic threshold by determining that the position value is above the dynamic threshold, not accessing the target resource by the WP;
based on at least determining that the WP accessing the target resource would not exceed the dynamic threshold by determining that the position value is below the dynamic threshold, accessing the target resource, by the WP, to perform the selected data management task; and
resuming execution of the selected data management task from the restart point.

16. The one or more non-transitory computer storage devices of claim 15, wherein the operations further comprise:
based on at least receiving a new warning indication from the target resource, persisting the new warning indication.

17. The one or more non-transitory computer storage devices of claim 15, wherein autonomously determining, by the WP, whether the WP accessing the target resource would exceed the dynamic threshold of WPs permitted to access the target resource comprises:
autonomously determining, by the WP, the dynamic threshold.

18. The one or more non-transitory computer storage devices of claim 15, wherein the operations further comprise:
determining a starting point for the selected data management task, wherein performing the selected data management task comprises starting the selected data management task from the determined starting point.

19. The one or more non-transitory computer storage devices of claim 15, wherein autonomously determining, by the WP, whether the WP accessing the target resource would exceed the dynamic threshold comprises the determining whether the WP accessing the target resource would exceed the dynamic threshold without receiving the dynamic threshold from another process.

20. The one or more non-transitory computer storage devices of claim 15, wherein the operations further comprise:
retrieving status information for the plurality of data management tasks, wherein the plurality of data management tasks includes the selected data management task, and wherein the status information for the plurality of data management tasks comprises the indications of historical warnings.

* * * * *